United States Patent Office 3,586,730
Patented June 22, 1971

3,586,730
DEHYDROGENATION OF HYDROCARBONS OF
4 TO 5 CARBON ATOMS
Glenn O. Michaels, South Holland, and John Mooi,
Homewood, Ill., assignors to Sinclair Research, Inc.,
New York, N.Y.
No Drawing. Filed Oct. 28, 1966, Ser. No. 590,210
Int. Cl. C07c 5/18
U.S. Cl. 260—680                                 9 Claims

ABSTRACT OF THE DISCLOSURE

Hydrocarbons of 4 to 5 carbon atoms are subjected to vapor phase dehydrogenation in the presence of a dehydrogenation catalyst consisting essentially of a minor amount of a platinum group metal, about 5 to 50 weight percent of $Cr_2O_3$, about 0.1 to 2 weight percent of alkali metal as the alkali metal oxide, and at least about 30 weight percent of activated alumina.

---

This invention relates to the dehydrogenation of hydrocarbons, and, more particularly, to the dehydrogenation of hydrocarbons of 4 to 5 carbon atoms in the presence of a novel catalyst.

Chromia-alumina catalysts have been used commercially for the dehydrogenation of paraffinic and olefinic compounds to form olefins and/or diolefins. Quite frequently a process will use a catalyst containing from 10 to 20 percent $Cr_2O_3$ carried on a high surface area support such as activated alumina, and commonly, a small amount of alkali metal oxide is included in the catalyst. These catalysts have been used in such processes as the production of butenes and butadiene from n-butane, isoprene and isoamylene from isopentane, styrene from ethyl benzene and a number of similar dehydrogenation reactions. The catalysts, however, exhibit inadequate activity and selectivity for the dehydrogenation of lower aliphatic hydrocarbons of 4 to 5 carbon atoms.

It has now been discovered that a composite containing a platinum group metal, chromia, alumina and an alkali metal oxide shows excellent catalytic activity and selectivity in the vapor phase dehydrogenation of lower aliphatic hydrocarbons of 4 to 5 carbon atoms. All constituents of the catalyst cooperate to produce the improved catalytic system of the present invention. The activity and selectivity of the new catalysts are far superior to similar catalysts containing only one of a platinum metal or chromia. Thus the vapor phase dehydrogenation of hydrocarbons in the presence of the novel catalyst of the invention considerably minimizes isomerization of both types, i.e., skeletal isomerization and double bond migration, so that higher yields and selectivities of the desired product are obtained.

The catalyst of the present invention contains $Cr_2O_3$, alkali metal oxide, alumina, and a small effective amount of a platinum group metal component. The amount of $Cr_2O_3$ can vary widely and will usually fall in the range of about 5 to 50 percent by weight, preferably about 10 to 20 percent by weight of the catalyst. The amount of alkali metal oxide present in the catalyst is important, as too little alkali metal oxide does not prevent isomerization and too much alkali metal oxide causes increased coke yields and lower activity. Acceptable results are usually obtained when about 0.1 to 2 percent, preferably about 0.4 to 1.5 percent, by weight of alkali metal as the metal oxide is present in the catalyst. It should be appreciated, however, that the most advantageous level of alkali metal oxide may vary from catalyst to catalyst and for the best results should be determined in every specific cse. The preferred alkali metal oxide is sodium oxide. Other alkali metal oxides, i.e. the oxides of potassium, cesium, and rubidium, can also be used. The minor amount of platinum group metal present in the catalyst to achieve the improved activity and selectivity of the present invention is generally from about 0.005 to 1 percent, preferably about 0.01 to 0.2 percent, by weight of the catalyst. The essential balance of the catalyst can be activated alumina. The catalyst may contain minor amounts of other ingredients provided they are not unduly deleterious to the desired result.

In accordance with the process of the present invention the hydrocarbon to be dehydrogenated is contacted under dehydrogenation conditions with the novel catalyst. The dehydrogenation process is conducted in the vapor phase at an elevated temperature, for instance, about 900 to 1200° F., preferably about 1000 to 1150° F., and usually under a hydrocarbon pressure of up to about 2 atmospheres or more. Generally, increased selectivities are obtained at hydrocarbon pressures below atmospheric, say down to about 0.1 to 0.3 atmosphere being preferred for economic reasons. An inert diluent or vacuum can be employed to reduce the hydrocarbon partial pressure of the hydrocarbon feed. Various essentially inert gaseous diluents can be employed but it is preferred to use nitrogen, hydorgen, or methane. The inert gas is usually present in an amount of about 0.5 to 50 moles, preferably about 5 to 25 moles, per mole of hydrocarbon feed. The contact time or weight hourly space velocity may vary depending on the temperature and pressure employed, but will generally range from about 0.05 to 5, preferably 0.10 to 2.0 WHSV.

The alumina component of the catalyst composition is the catalyst base, and preferably the major component and usually at least about 30 weight percent of the catalyst. Activated or gamma family aluminas can be employed such as those derived by calcination of amorphous hydrous alumina, alumina monohydrate, alumina trihydrate or their mixtures, at elevated temperatures of, for instance, about 750 to 1500° F., preferably about 850 to 1400° F. Advantageously, the alumina precursor may be a mixture predominating in, for instance, about 65 to 95 percent by weight, one or more of the alumina trihydrates: bayerite, nordstrandite or gibbsite, and containing about 5 to 35 percent by weight of alumina monohydrate (boehmite), amorphous alumina or their mixtures. Catalyst bases of this type are disclosed in U.S. Pats. Nos. 2,838,444 and 2,838,445. The alumina base or catalyst may also contain small amounts of other materials, e.g., solid oxides.

Impregnation of the alumina base with the catalytically-active metal components, i.e., chromia, alkali metal and platinum group metal, can be by various methods. For instance, the base can be mixed with an aqueous solution of a water-soluble salt of the catalytically-active components of the invention to absorb all or part of the solution in the support which is then dried and calcined, for instance at the temperatures noted above, to give an active catalyst. Alternatively, the active components can be precipitated on the support through neutralization of a slurry of the support and water-soluble compounds of the catalytically-active metals and then drying and calcining. Calcining activates the catalyst and, if not already present as the oxides, may convert the catalytically-active metal components to their oxide form. The impregnation with the catalytically-active components can be done separately or simultaneously.

If desired, the alumina base can be ground before addition of the catalytic metals and the resulting material formed, if desired, into larger particles, impregnated and dried before effecting the calcination which gives the final catalyst. Alternatively, the base particles can be directly impregnated, dried and calcined; or directly impregnated, ground and formed into shaped particles by tabletting or extrusion and then recalcined. It is preferred to calcine the alumina prior to addition of the catalytically-active components. After the catalytically-active components are added to the base, the resulting catalyst composition can be activated by drying and calcination, for instance, at the temperatures noted above.

The hydrocarbon feeds of the present invention are generally aliphatic hydrocarbons of 4 to 5 carbon atoms. Feeds of longer hydrocarbon chains tend to undergo cracking to lighter materials. A portion or all of the feed can be unsaturated but the preferred feeds are the normal and branched chain paraffins, including the cyclic paraffins such as cyclopentane. Among the unsaturated feeds which can be used are the mono-olefins of the $C_4$ to $C_5$ range which may undergo dehydrogenation to yield dienes.

The invention will be further illustrated by the following examples which are not to be considered limiting.

EXAMPLE I

A commercially available chromia-alumina dehydrogenation catalyst (250 grams) containing approximately 20 percent of $Cr_2O_3$ and 0.3 percent of $Na_2O$, by weight of the total catalyst, the balance being $Al_2O_3$, was impregnated with 225 ml. of an aqueous solution of chloroplatinic acid having a concentration of 0.67 mg. of Pt, calculated as the free metal, per ml. of solution to provide a composition which, after removal of 156 ml. of excess solution, drying at about 230° F. and calcining at 1050° F. for 3 hours, contained 0.02 percent of platinum, by weight of the total catalyst.

EXAMPLE II

Another portion of the commercial chromia-alumina catalyst of Example I was impregnated with an aqueous solution of chloroplatinic acid, dried and calcined as in Example I to yield a final catalyst containing 0.04 weight percent of platinum.

EXAMPLE III

Using a procedure similar to Examples I and II, a $Pt/Cr_2O_3$-$Al_2O_3$ catalyst was prepared containing 0.08 weight percent of platinum.

EXAMPLE IV

The promoted chromia-alumina catalysts of the foregoing Examples I–III, containing varying amounts of platinum, were separately employed in the vapor-phase dehydrogenation of n-butane to yield butadiene. Control runs using the unpromoted commercial chromia-alumina catalyst were also performed for purposes of comparison.

The procedure involved charging the catalysts to a 1 inch Universal type reactor, raising the reactor temperature to operating conditions in a slow stream of nitrogen and introducing the feed to the reactor without any further pretreat of the catalyst. Pure grade n-butane was used as the feed. Other reaction conditions and product analyses are summarized in Table I.

TABLE I
[Dehydrogenation of n-butane]

| | Catalyst | | | | | | | | |
|---|---|---|---|---|---|---|---|---|---|
| | $Cr_2O_3$—$Al_2O_3$—$Na_2O$ | | $Cr_2O_3$—$Al_2O_3$—$Na_2O$ plus 0.02% Pt | | $Cr_2O_3$—$Al_2O_3$—$Na_2O$ plus 0.04% Pt | | | | $Cr_2O_3$—$Al_2O_3$—$Na_2O$ plus 0.08% Pt |
| Run No | 79-02 | 79-05 | 78-01 | 78-03 | 03-02 | 83-01 | 83-02 | 83-05 | 84-03 |
| Conditions: | | | | | | | | | |
| Temperature, °F., average | 997 | 1,056 | 1,007 | 1,057 | 1,008 | 1,003 | 1,008 | 1,085 | 1,045 |
| Inlet pressure, mm. of Hg | 190 | 194 | 202 | 192 | 157 | 187 | 186 | 204 | 198 |
| WHSV | 1.16 | 1.12 | 1.10 | 1.04 | 1.10 | .99 | 1.01 | 1.12 | 1.11 |
| Length of run, min | 15 | 15 | 15 | 15 | 15 | 15 | 15 | 15 | 15 |
| n-Butane conversion, wt. percent | 41.1 | 59.4 | 44.5 | 59.9 | 41.1 | 42.7 | 27.1 | 55.7 | 45.5 |
| Selectivity to butenes, mole percent | 80.0 | 71.0 | 75.8 | 69.2 | 81.2 | 79.5 | 78.6 | 62.9 | 72.8 |
| Selectivity to butadiene, mole percent | 14.3 | 17.9 | 16.4 | 18.9 | 15.5 | 16.1 | 17.1 | 23.3 | 21.0 |
| Total selectivity, mole percent | 94.3 | 88.9 | 92.2 | 88.1 | 96.7 | 95.6 | 95.7 | 86.2 | 93.8 |
| Coke on catalyst, wt. percent | 1.03 | 2.67 | .88 | 2.52 | .78 | .21 | .32 | 2.92 | .98 |

The data presented in the foregoing table illustrate that the most apparent effect of adding platinum to the chromia-alumina catalyst is that in dehydrogenation of a n-butane feed the selectivity to butadiene is improved. Thus, at approximately 40 percent conversion of n-butane, and operating at a space velocity of about 1 WHSV, the selectivities to butadiene using catalysts containing 0, 0.02, 0.04 and 0.08 wt. percent of Pt compares as follows:

TABLE II

| Run No | 79-02 | 78-01 | 83-01 | 03-02 | 84-03 |
|---|---|---|---|---|---|
| Platinum, wt. percent | 0.00 | .02 | .04 | .04 | .08 |
| WHSV | 1.16 | 1.10 | .99 | 1.10 | 1.11 |
| Temperature, °F | 997 | 1,007 | 1,003 | 1,008 | 1,045 |
| n-Butane conversion, wt. percent | 41.1 | 44.5 | 42.7 | 41.1 | 45.5 |
| Selectivity to butadiene, mole percent | 14.3 | 16.4 | 16.1 | 15.5 | 21.0 |

One of the important factors in the increased butadiene selectivity is the decrease in coke formation effected by the presence of the platinum promoter. This result is most noticeable in comparing the catalyst containing 0.04 percent Pt with the platinum-free control catalyst; at conversion levels up to 50 percent, there is often less than one-half as much coke formed per mole of n-butane converted with the platinum-containing catalyst than with the control.

It might be suggested that the improved selectivity of the Pt-promoted catalysts might be due to $Cl^-$ promotion rather than the presence of Pt (chloride ion is introduced to the catalyst when the catalyst is impregnated with chloroplatinic acid). The commercial chromia-alumina catalyst was prepared with added $Cl^-$ equivalent to that added when the catalyst was impregnated with 0.08 percent Pt. Data on the chloride promoted catalyst is given in Table III.

TABLE III

[Dehydrogenation of n-butane]

| | Catalyst | | | | |
|---|---|---|---|---|---|
| | $Cr_2O_3$—$Al_2O_3$—$Na_2O$ plus $Cl^-$ | | $Cr_2O_3$—$Al_2O_3$—$Na_2O$ | | $Cr_2O_3$—$Al_2O_3$—$Na_2O$ plus .06% Pt.[2] |
| Run No | 87–01 | 87–02 | 79–06 | 89–01 | 99–03 |
| | | | | (¹) | |
| Conditions: | | | | | |
| Temperature, °F., average | 1,006 | 1,014 | 1,052 | 1,015 | 1,075 |
| Inlet pressure, mm. of Hg | 188 | 187 | 198 | 227 | 205 |
| WHSV | 1.10 | 1.02 | 1.08 | 1.05 | 2.15 |
| Length of run, min | 15 | 15 | 15 | 15 | 15 |
| Product distribution, wt. percent: | | | | | |
| $H_2$ | 1.83 | 1.97 | 2.82 | 2.46 | 2.06 |
| Methane | .17 | .28 | .52 | .42 | .32 |
| Ethylene | .17 | .31 | .74 | .39 | .47 |
| Ethane | .19 | .35 | .78 | .43 | .41 |
| Propylene | .24 | .37 | .58 | .45 | .36 |
| Propane | .07 | .12 | .22 | .18 | .07 |
| Butadiene | 6.33 | 7.27 | 9.55 | 6.28 | 9.52 |
| Butene-1 | 9.31 | 9.95 | 11.85 | 10.23 | 9.79 |
| c-Butene-2 | 9.48 | 10.89 | 13.10 | 10.44 | 9.79 |
| t-Butene-2 | 12.19 | 13.57 | 14.72 | 13.45 | 12.10 |
| Isobutane | | | | .01 | |
| Butane | 59.25 | 54.16 | 42.76 | 54.06 | 53.87 |
| $C_5+$ | | .02 | .23 | .02 | |
| Coke on catalyst | .78 | .77 | 2.11 | 1.17 | 1.25 |
| n-Butane conversion, wt. percent | 40.7 | 45.8 | 57.2 | 45.9 | 46.1 |
| Selectivity to butenes, mole percent | 78.9 | 77.9 | 71.9 | 77.1 | 71.3 |
| Selectivity to butadiene, mole percent | 16.7 | 17.1 | 17.9 | 14.7 | 22.2 |
| Total selectivity, mole percent | 95.6 | 95.0 | 89.8 | 91.8 | 93.5 |

[1] Main reactor followed by second reactor containing 40 cc. bulk CuO. Temp.=804–835° F.
[2] Added as platinum tetraaminehydroxide.

Butadiene selectivity was generally higher and coke, methane, ethane, ethylene, propylene and $H_2$ yields were all lower with the chloride catalyst (Runs 87–01 and 87–02) than with the unpromoted catalyst (Runs 79–06 and 89–01). However, the improvement noted with the chloride catalyst is not as high as with the Pt catalyst. Thus, the selectivity to butadiene, for example, is improved slightly over the chromia-alumina catalyst but not nearly as great as the improvement with the 0.08 percent Pt catalyst of Run 84–03 (Table I). It is concluded that the improvement in butadiene selectivity is due mainly to the presence of Pt. This conclusion is further substantiated by data obtained on a chromia-alumina catalyst impregnated with tetraamineplatinous hydroxide (Run 99–03 of Table III). In this case, the catalyst contained 0.06 percent with no added $Cl^-$ and the catalyst also exhibited lower $H_2$, coke, ethane, ethylene and propylene yields.

Compared and reported in Table IV, following, are runs at elevated space velocities, i.e., at greater than 2 WHSV, with the 0.08 percent Pt-promoted catalyst of the foregoing example (Run 02–01) and with the unpromoted commercial chromia-alumina catalyst of Example I (Run 04–02).

TABLE IV

[Dehydrogenation of n-butane]

| | Catalyst | |
|---|---|---|
| | $Cr_2O_3$—$Al_2O_3$—$Na_2O$ plus 0.08% Pt | $Cr_2O_3$—$Al_2O_3$—$Na_2O$ |
| Run No | 02–01 | 04–02 |
| Conditions: | | |
| Temperature, °F., average | 1,110 | 1,111 |
| Inlet pressure, mm. of Hg | 168 | 170 |
| WHSV | 2.65 | 2.77 |
| Length of run, min | 10 | 10 |
| n-Butane conversion, wt. percent | 42.8 | 50.2 |
| Selectivity to butenes, mole percent | 62.6 | 61.1 |
| Selectivity to butadiene, mole percent | 28.8 | 26.7 |
| Total selectivity, mole percent | 91.4 | 87.8 |
| Coke on catalyst, wt. percent | 1.78 | 3.08 |

The data presented in Table IV illustrate again the improvement in increased butadiene selectivity and decreased coke formation realized through the use of the platinum-containing catalysts of the present invention.

In Table V are presented the results obtained when a palladium-promoted chromia-alumina catalyst was employed in the dehydrogenation of n-butane, the base catalyst being the commercial catalyst described in Example I.

Table V

Dehydrogenation of n-butane

Catalyst—$Cr_2O_3$–$Al_2O_3$–$Na_2O$ plus 0.06 wt. percent Pd.
Run No.—96–04.
Conditions:
  Temperature, °F., av.—1,063.
  Inlet pressure, mm. of Hg—169.
  WHSV—1.46.
  Length of run, min.—15.
n-Butane conversion, wt. percent—46.4.
Selectivity to butenes, mole percent—72.4.
Selectivity to butadiene, mole percent—23.3.
Total selectivity, mole percent—95.7.
Coke on catalyst, wt. percent—.37.

As evidenced from the data in Table V, the use of 0.06 percent of palladium as the platinum group metal promoter (run 96–04) results in even greater improvements in reducing coke formation than does the use of platinum in the same amounts (Run 99–03 of Table III). Also noted, is the fact that the Pd catalyst effected higher total selectivity than any of the catalysts tested in the foregoing examples. Selectivity to butadiene is likewise seen to be increased when results are compared with the unpromoted chromia-alumina catalysts of Tables I–IV (Runs 79–02, 79–05, 79–06, 89–01 and 04–02).

Further runs were made using a mixed butane-butene feed (approximately 70 wt. percent n-butane and 30 wt. percent butenes). Typical results when using the unpromoted commercial chromia-alumina catalyst of Example I and when employing that catalyst with 0.04 wt. percent of Pt are presented in Table VI.

TABLE VI

[Feed: n-Butane and mixed butenes, 1070–1,088° F., 1.5–1.7 WHSV, 135 mm. Hg]

| Cycle No.: | $Cr_2O_3$—$Al_2O_3$—$Na_2O$ plus 0.04% Pt [1] | $Cr_2O_3$—$A_2O_3$—$Na_2O$ |
|---|---|---|
| 1 | 48 | 40 |
| 2 | 17 | 45 |
| 3 | 20 | 44 |
| 4 | 25 | 45 |
| 5 | 45 | 17 |
| 6 | 42 | 33 |
| 7 | 41 | 18 |

[1] Conversion of n-butane, wt. percent.

As evidenced by the data in Table VI, conversion of n-butane with the Pt catalyst was very high on the first cycle and then dropped to a very low value. On succeeding cycles conversion increased until some sort of lineout was reached in cycles 5, 6, and 7. With the unpromoted catalyst, conversion was quite consistent during the first four cycles and then decreased to a very low value.

Aging characteristics of the platinum group metal-promoted and the unpromoted chromia-alumina catalysts were studied by placing the catalysts in test baskets in commercial dehydrogenation units, removing them at periodic intervals and testing for activity and selectivity in the laboratory-scale n-butane dehydrogenation process as conducted in the preceding examples. In each instance the catalyst was diluted with one part by volume of electricians beads (Size 1–C) to one part by volume of catalyst. Normal catalyst charge was 146.5 grams or approximately 125 cc. The procedure was to bring the catalyst to operating temperature in flowing air. Product was collected and analyzed from the first cycle but in most cases the results from the first cycle were ignored or discounted in importance. In Table VII is presented the observations on butadiene selectivity and activity of the unpromoted and promoted commercial catalyst of Example I, prior to and after aging in test baskets for 82 days. It should be noted that the 82 days treatment is roughly equivalent to over one years actual aging in the main bed of a commercial unit, and represents a catalyst that is almost completely spent. Reaction conditions included nearly constant conditions of time, pressure and space velocity, as follows:

Exit pressure: 135 mm. Hg
WHSV: 1.1
Length of run: 15 min.

TABLE VII

| | Butadiene yield, wt. percent of charge | | | | Conversion of n-butane, wt. percent | | | |
|---|---|---|---|---|---|---|---|---|
| | Catalyst | | | | | | | |
| | $Cr_2O_3$—$Al_2O_3$—$Na_2O$ plus 0.4% Pt | | $Cr_2O_3$—$Al_2O_3$—$Na_2O$ | | $Cr_2O_3$—$Al_2O_3$—$Na_2O$ plus 0.4% Pt | | $Cr_2O_3$—$Al_2O_3$—$Na_2O$ | |
| | Virgin | Aged 82 days | Virgin | Aged 82 days | Virgin | Aged 82 days | Virgin | Aged 82 days |
| Temperature, °F.: | | | | | | | | |
| 1,015 | 7.5 | 4.8 | 6.8 | 0.8 | 45.5 | 24 | 46.5 | 6.5 |
| 1,050 | 11.0 | 8.1 | 9.5 | 6.3 | 53.5 | 42 | 57 | 30.5 |
| 1,100 | | 12.9 | | 9.3 | | 49 | | 40 |
| 1,150 | | 15.0 | | 10.3 | | 51.5 | | 48 |

Perusal of the data of Table VII readily reveals the superior aging characteristics of the Pt-promoted catalyst of the present invention. Selectivity to butadiene is higher for the promoted catalyst both before and after aging, and total activity, which is initially lower for the Pt catalyst, is considerably higher after aging for the promoted catalyst than for the unpromoted chromia-alumina.

Vapor phase dehydrogenation of isopentane to yield isoprene was conducted over the unpromoted, commercial chromia-alumina catalyst of Example I, and the results (Table VIII) compared with those flowing from the use of the platinum and palladium-promoted forms of the catalyst. The procedure involved was that described in Example IV above. Perhaps the most significant results are the molar ratios of isoprene to piperylene in the product.

TABLE VIII

[Dehydrogenation of isopentane]

| | Catalyst | | | |
|---|---|---|---|---|
| | $Cr_2O_3$—$Al_2O_3$—$Na_2O$ (virgin) | $Cr_2O_3$—$Al_2O_3$—$Na_2O$ plus 0.04 Pt (virgin) | $Cr_2O_3$—$Al_2O_3$—$Na_2O$ plus 0.04% Pt (aged 82 days) | $Cr_2O_3$—$Al_2O_3$—$Na_2O$ plus 0.04% Pd (aged 51 days) |
| Run No | 80-01 | 26-02 | 27-01B | 25-07A |
| Conditions: | | | | |
| Temperature, °F., average | 1,010 | 1,013 | 1,006 | 1,156 |
| Inlet pressure, mm. of Hg | 185 | 159 | 143 | 165 |
| WHSV | 1.07 | 1.00 | .98 | .96 |
| Length of run, min | 15 | 15 | 15 | 15 |
| Isopentane conversion, wt. percent | 38.4 | 40.8 | 18.3 | 56.7 |
| Selectivity to isoamylenes, mole percent | 60.2 | 53.2 | 59.8 | 24.3 |
| Selectivity to isoprene, mole percent | 21.1 | 26.9 | 26.7 | 24.8 |
| Total selectivity, mole percent | 81.3 | 80.1 | 86.5 | 49.1 |
| Coke on catalyst, wt. percent | 1.17 | 2.50 | .33 | 10.70 |
| Isoprene to piperylene, mole ratio | 3.29 | 5.88 | 23.1 | 9.35 |

Data gathered from all of the isopentane dehydrogenation runs (Table VIII contains only a representative few) regarding the isoprene to piperylene ratios in the product were averaged for each of the catalyst. The average performances of the catalysts in this respect are reported in Table IX, below.

Table IX

| Catalyst: | Average isoprene/piperylene ratio |
|---|---|
| $Cr_2O_3$-$Al_2O_3$-$Na_2O$ + 0.04% Pt (virgin) | 4.9 |
| $Cr_2O_3$-$Al_2O_3$-$Na_2O$ + 0.04% Pt (aged 82 days) | 16.0 |
| $Cr_2O_3$-$Al_2O_3$-$Na_2O$ + 0.04% Pd (aged 51 days) | 5.5 |
| $Cr_2O_3$-$Al_2O_3$-$Na_2O$ (virgin) | 3.7 |

The amount of undesirable piperylene produced by the platinum group metal-promoted catalyst is shown in Table IX to be less than that produced by the virgin, unpromoted catalyst. As the platinum catalysts are aged, the amount of piperylene produced is seen to diminish.

It is claimed:
1. A process for the dehydrogenation of a feed comprising n-butane which comprises contacting said feed under vapor phase dehydrogenation conditions, including a temperature of about 900 to 1200° F., with a dehydrogenation catalyst consisting essentially of a minor amount of a platinum group metal, about 5 to 50 percent by weight of $Cr_2O_3$, about 0.1 to 2 percent by weight of alkali metal as the alkali metal oxide, and at least about 30 percent by weight of activated alumina.

2. A process for the dehydrogenation of a feed consisting essentially of dehydrogenatable hydrocarbons of 4 to 5 carbon atoms selected from the group consisting of paraffins, mono-olefins and mixtures of the foregoing which comprises contacting said feed under vapor phase dehydrogenation conditions, including a temperature of about 900 to 1200° F., with a dehydrogenation catalyst consisting essentially of a minor amount of palladium, about 5 to 50 percent by weight of $Cr_2O_3$, about 0.1 to 2 percent by weight of alkali metal as the alkali metal oxide, and, as the major component of the catalyst, activated alumina.

3. The process of claim 2 wherein the alkali metal oxide is sodium oxide.

4. A process for the dehydrogenation of a feed consisting essentially of dehydrogenatable hydrocarbons of 4 to 5 carbon atoms selected from the group consisting of paraffins, mono-olefins and mixtures of the foregoing which comprises contacting said feed under vapor phase dehydrogenation conditions, including a temperature of about 900 to 1200° F., with a dehydrogenation catalyst consisting essentially of a minor amount of a platinum group metal, about 5 to 50 percent by weight of $Cr_2O_3$, about 0.4 to 1.5 percent by weight of alkali metal as the alkali metal oxide, and at least about 30 percent by weight of activated alumina.

5. The process of claim 4 wherein the platinum group metal is platinum and the activated alumina is the major component of the catalyst.

6. A process for the dehydrogenation of a feed consisting essentially of dehydrogenatable hydrocarbons of 4 to 5 carbon atoms selected from the group consisting paraffins, mono-olefins and mixtures of the foregoing of paraffins, mono-olefins and mixtures of the foregoing which comprises contacting said feed under vapor phase dehydrogenation conditions, including a temperature of about 900 to 1200° F., with a dehydrogenation catalyst consisting essentially of a minor amount of platinum, about 5 to 50 percent by weight of $Cr_2O_3$, about 0.4 to 1.5 percent by weight of sodium as sodium oxide, and, as the major component of the catalyst, activated alumina.

7. A process for the dehydrogenation of a feed consisting essentially of dehydrogenatable hydrocarbons of 4 to 5 carbon atoms selected from the group consisting of paraffins, mono-olefins and mixtures of the foregoing which comprises contacting said feed under vapor phase dehydrogenation conditions, including a temperature of about 900 to 1200° F., with a dehydrogenation catalyst consisting essentially of about 0.01 to 1 weight percent of a platinum group metal, about 10 to 20 percent by weight of $Cr_2O_3$, about 0.4 to 1.5 percent by weight of sodium as sodium oxide, and a major amount of activated alumina.

8. The process of claim 7 wherein the platinum group metal is platinum.

9. The process of claim 8 wherein the platinum is present in the catalyst in an amount of about 0.02 to 0.2 weight percent.

References Cited
UNITED STATES PATENTS

| | | | |
|---|---|---|---|
| 2,785,209 | 3/1957 | Schmetterling et al. | 260—673.5 |
| 2,943,067 | 6/1960 | Sieg | 260—683.3X |
| 2,985,696 | 5/1961 | Magness | 260—683.3X |
| 3,126,426 | 3/1964 | Turnquest et al. | 260—683.3 |
| 3,395,196 | 7/1968 | Heckelsberg | 260—683 |

PAUL M. COUGHLAN, JR., Primary Examiner

U.S. Cl. X.R.

252—46.5; 260—683.3